United States Patent
Murad (10) Patent No.: US 10,710,593 B2
(45) Date of Patent: Jul. 14, 2020

(54) SYSTEM AND METHOD FOR AUTONOMOUS CONTROL OF A VEHICLE

(71) Applicant: GM GLOBAL TECHNOLOGY OPERATIONS LLC, Detroit, MI (US)

(72) Inventor: Mohannad Murad, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 64 days.

(21) Appl. No.: 16/120,936

(22) Filed: Sep. 4, 2018

(65) Prior Publication Data

US 2020/0070837 A1    Mar. 5, 2020

(51) Int. Cl.
| | |
|---|---|
| *B60W 40/06* | (2012.01) |
| *G05D 1/00* | (2006.01) |
| *G05D 1/02* | (2020.01) |
| *G06K 9/00* | (2006.01) |

(52) U.S. Cl.
CPC ........... *B60W 40/06* (2013.01); *G05D 1/0088* (2013.01); *G05D 1/0223* (2013.01); *G05D 1/0246* (2013.01); *G06K 9/00362* (2013.01); *G06K 9/00791* (2013.01); *B60W 2552/00* (2020.02); *B60W 2555/20* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 9,090,264 B1 | 7/2015 | Zhao et al. | |
| 2015/0363654 A1 | 12/2015 | Zhao et al. | |
| 2016/0196656 A1* | 7/2016 | Cund | B60W 40/06 348/148 |
| 2018/0312165 A1* | 11/2018 | Dudar | B60G 17/0195 |
| 2018/0341265 A1* | 11/2018 | Myers | G01C 21/3407 |
| 2019/0210619 A1* | 7/2019 | Linda | B60W 40/064 |
| 2019/0351911 A1* | 11/2019 | Anezaki | G08G 1/133 |

FOREIGN PATENT DOCUMENTS

GB    2524308    * 3/2014

* cited by examiner

Primary Examiner — Abdhesh K Jha (57) ABSTRACT

An automotive vehicle includes an actuator configured to control vehicle steering, acceleration, or shifting, a sensor configured to capture images of a region exterior to the vehicle, and a controller in communication with the actuator and the sensor. The controller is configured to selectively control the actuator according to a primary mode and a secondary mode. The controller is additionally configured to detect liquid on a driving surface proximate the vehicle, to estimate a depth of the liquid based on images captured by the sensor, and to control the actuator in the secondary mode in response to the depth exceeding a predefined threshold.

16 Claims, 4 Drawing Sheets

SYSTEM AND METHOD FOR AUTONOMOUS CONTROL OF A VEHICLE

INTRODUCTION

Liquid on a driving surface, e.g. precipitation, may impose various challenges in vehicle control. For example, liquid on a road may reduce the coefficient of friction between the tires of the vehicle and the driving surface. Moreover, when the depth of the liquid rises too high, e.g. during flooding conditions or very deep puddles, the driving surface may become impassable for the vehicle without incurring a risk of damage to the vehicle.

SUMMARY

An automotive vehicle according to the present disclosure includes an actuator configured to control vehicle steering, acceleration, speed, or shifting, a sensor configured to capture images of a region exterior to the vehicle, and a controller in communication with the actuator and the sensor. The controller is configured to selectively control the actuator according to a primary mode and a secondary mode. The controller is additionally configured to detect liquid on a driving surface proximate the vehicle, to estimate a depth of the liquid based on images captured by the sensor, and to control the actuator in the secondary mode in response to the depth exceeding a predefined threshold.

In an exemplary embodiment, the controller is configured to estimate the depth of the liquid based on a geolocation of the liquid on the driving surface and on topographical data for the geolocation.

In an exemplary embodiment, the controller is configured to estimate the depth of the liquid based on a position of a line of symmetry associated with the liquid. In such embodiments, the controller may be configured to identify an object external to the vehicle based on signals from the sensor, where the object has at least one known dimension, and to estimate the depth of the liquid based on the position of the line of symmetry relative to the object external to the vehicle.

In an exemplary embodiment, the controller is configured to detect liquid based, in part, by detecting a color reflection in images captured by the sensor.

In an exemplary embodiment, the controller is further configured to estimate an area of the liquid based on the images captured by the sensor, and to control the actuator in the secondary mode in further response to the area of the liquid.

In an exemplary embodiment, the controller is configured to identify an object external to the vehicle based on signals from the sensor, where the object having at least one known dimension, and to estimate the depth of the liquid based on an occluded portion of the object.

In an exemplary embodiment, the vehicle additionally includes an exterior illumination source. In such embodiments, the controller is configured to selectively activate the exterior illumination source and estimate the depth of the liquid based on a reflection characteristic of the liquid caused by the exterior illumination source.

In an exemplary embodiment, the primary mode comprises autonomous control of the actuator, and the secondary mode comprises discontinuing autonomous control of the actuator.

In an exemplary embodiment, the primary mode comprises autonomous control of the actuator according to a default path, and the secondary mode comprises autonomous control of the actuator to deviate from the default path. In such embodiments, the controller may be configured to control the actuator in the secondary mode in further response to a detected pedestrian proximate the liquid.

A method of controlling a vehicle according to the present disclosure includes providing the vehicle with an actuator configured to control vehicle steering, acceleration, speed, or shifting, a sensor configured to capture images of a region exterior to the vehicle, and a controller in communication with the actuator and the sensor. The method also includes automatically controlling the actuator, via the controller, in a primary mode of operation. The method additionally includes automatically detecting liquid, via the controller, on a driving surface proximate the vehicle, and automatically estimating, via the controller, a depth of the liquid based on images captured by the sensor. The method further includes, in response to the depth exceeding a predefined threshold, automatically controlling the actuator, via the controller, in a secondary mode of operation.

In an exemplary embodiment, the automatically estimating the depth of the liquid is further based on a geolocation of the liquid and on topographical data for the geolocation.

In an exemplary embodiment, the automatically estimating the depth of the liquid based on images captured by the sensor is based on a position of a line of symmetry associated with the liquid. Such embodiments may include automatically identifying, via the controller, an object external to the vehicle based on signals from the sensor, where the object has at least one known dimension. In such embodiments, the automatically estimating the depth of the liquid is based on the position of the line of symmetry relative to the object external to the vehicle.

In an exemplary embodiment, the method additionally includes automatically identifying, via the controller, an object external to the vehicle based on signals from the sensor, where the object has at least one known dimension. The automatically estimating the depth of the liquid is based on an occluded region of the object.

In an exemplary embodiment, the method additionally includes providing the vehicle with an exterior illumination source, and automatically activating the exterior illumination source via the controller in response to automatically detecting the liquid. The automatically estimating the depth of the liquid based on images captured by the sensor is based on a reflection characteristic of the liquid caused by the exterior illumination source.

In an exemplary embodiment, automatically controlling the actuator in the primary mode of operation includes autonomous control of the actuator, and automatically controlling the actuator in the secondary mode of operation includes discontinuing autonomous control of the actuator.

In an exemplary embodiment, automatically controlling the actuator in the primary mode of operation includes autonomous control of the actuator according to a default path at a default speed, and automatically controlling the actuator in the secondary mode of operation includes autonomous control of the actuator to deviate from the default path or the default speed. In such embodiments, the automatically controlling the actuator in the secondary mode of operation may be in further response to a detected pedestrian proximate the liquid.

Embodiments according to the present disclosure provide a number of advantages. For example, the present disclosure provides a system and method for automatically detecting when a driving surface is impassable or otherwise inadvisable for driving upon due to liquid, and to automatically control the vehicle appropriately. Customer satisfaction and vehicle reliability may thereby be improved.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
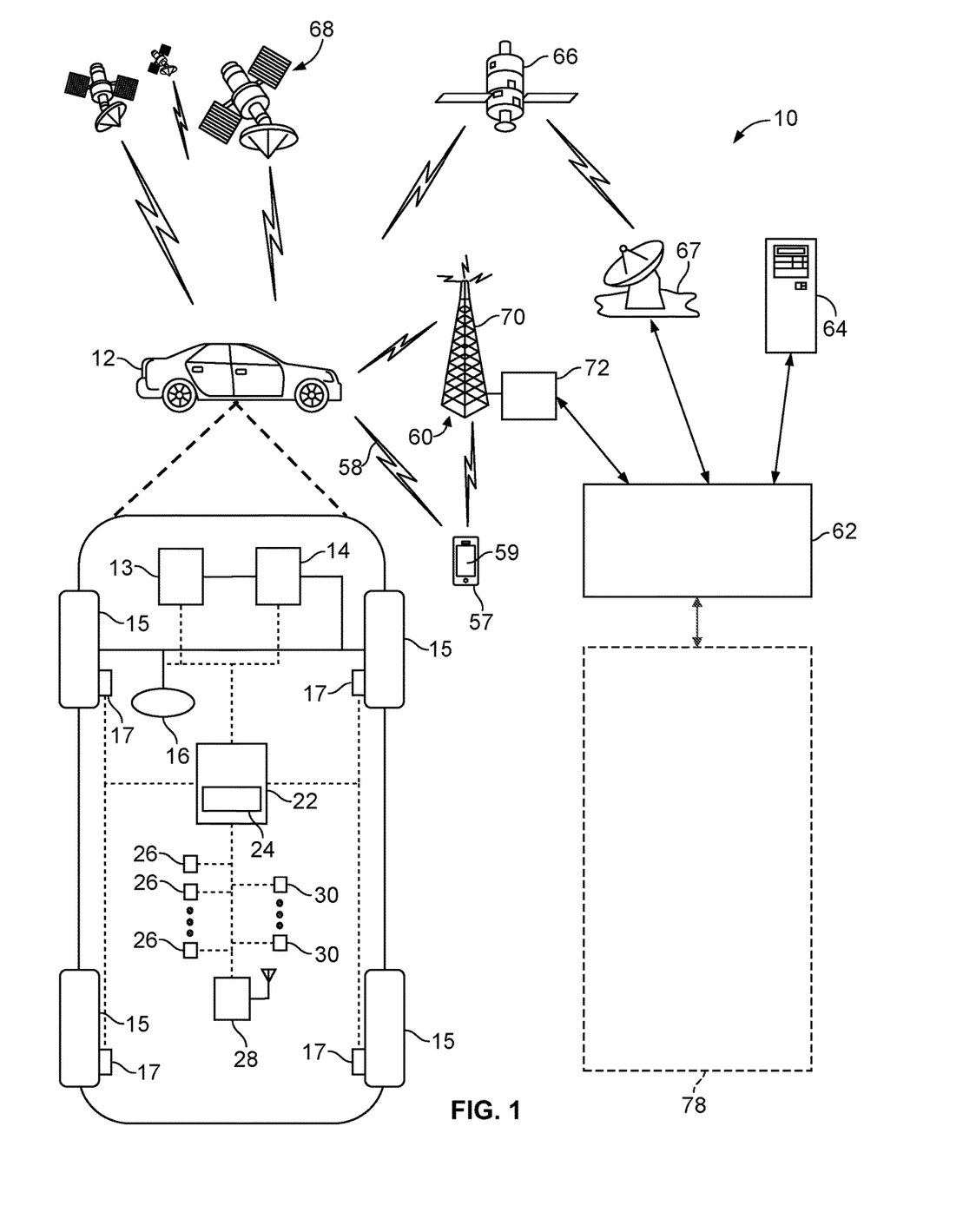
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Three automation system. A Level Three system indicates "Conditional Automation", referring to the driving mode-specific performance by an automated driving system of all aspects of the dynamic driving task with the expectation that the human driver will respond appropriately to a request to intervene.

Other embodiments according to the present disclosure may be implemented in conjunction with so-called Level One or Level Two automation systems. A Level One system indicates "driver assistance", referring to the driving mode-specific execution by a driver assistance system of either steering or acceleration using information about the driving environment and with the expectation that the human driver perform all remaining aspects of the dynamic driving task. A Level Two system indicates "Partial Automation", referring to the driving mode-specific execution by one or more driver assistance systems of both steering and acceleration using information about the driving environment and with the expectation that the human driver perform all remaining aspects of the dynamic driving task.

Still other embodiments according to the present disclosure may also be implemented in conjunction with so-called Level Four or Level Five automation systems. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can, be managed by a human driver.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device. 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC. 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers, Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
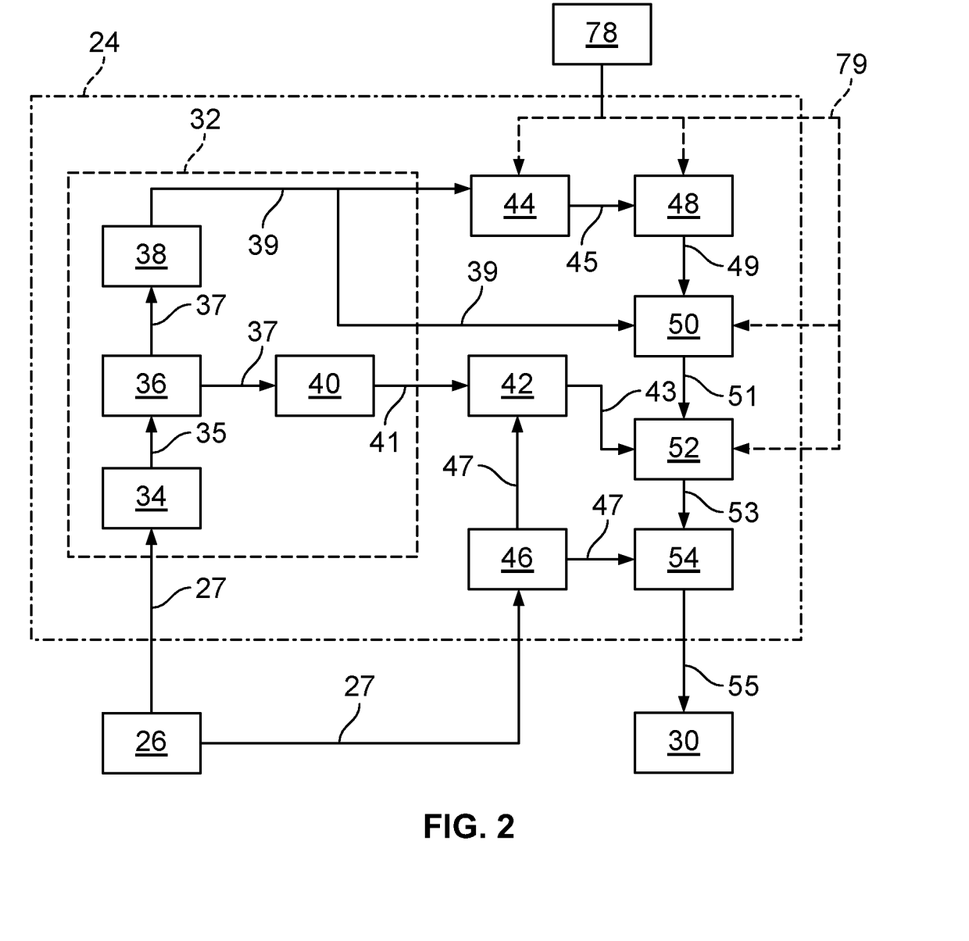
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data. 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of construction zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and mad features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 5I and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

In some driving conditions, it may be inadvisable for the vehicle 12 to proceed according to the route generated by the path planning module 50 according to the nominal ADS algorithm. As an example, when a driving surface is covered in liquid, e.g. water, that exceeds a given height, then vehicle travel through the liquid may result in undesirable effects on the vehicle. Furthermore, if a pedestrian is proximate the liquid, it may be desirable to avoid driving through the liquid at speed to thereby avoid splashing the pedestrian with liquid.

Figure 3A:
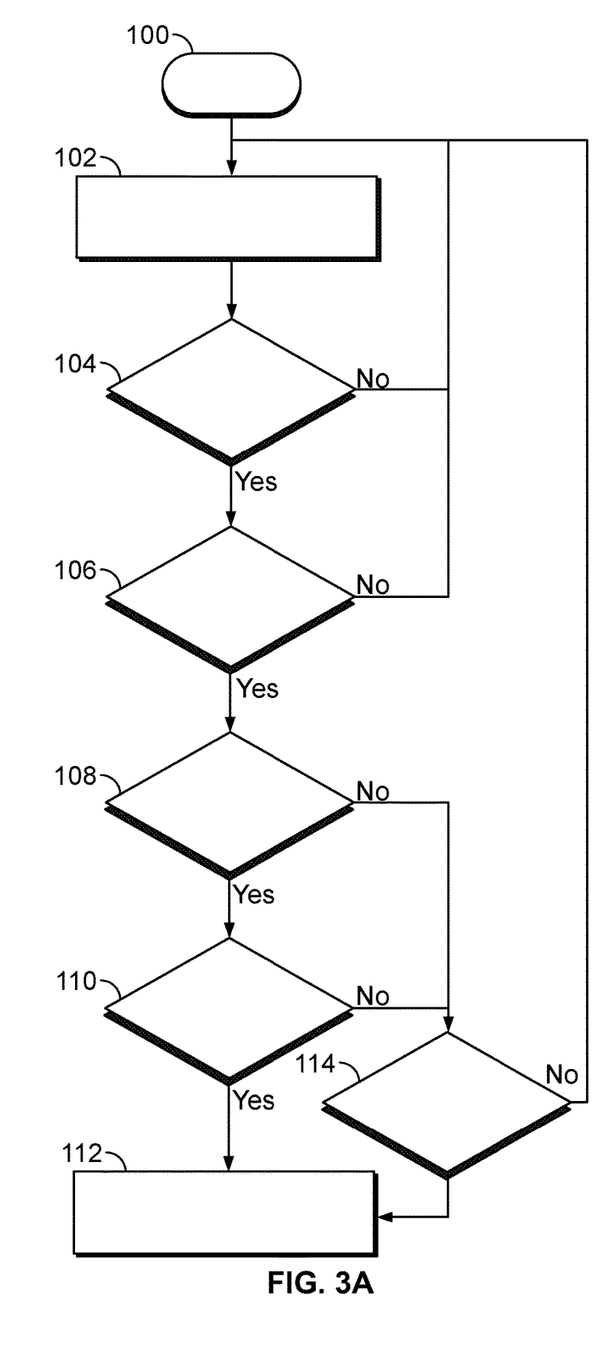
FIGS. 3A and 3B are flowchart representations of a method of controlling a vehicle according to an embodiment of the present disclosure.

Referring now to FIG. 3, a method of controlling a vehicle according to an embodiment of the present disclosure is illustrated in flowchart form. The algorithm begins at block 100.

The vehicle 12 is controlled by the ADS 24 according to a primary mode of operation, as illustrated at block 102. The primary mode refers to control of the actuators 30 by the ADS 24 to achieve the route determined by the path planning module 50.

A determination is made of whether data captured by the sensors 26 indicate that expected road details are missing, as illustrated at operation 104. As a nonlimiting example, road details may refer to lane markings, other road paint, or other features which may be observable on a driving surface. Missing details may indicate the presence of a substance on the driving surface. In a first exemplary embodiment, such details may be determined to be missing in response to the sensor data indicating a discontinuity in such road details. In a second exemplary embodiment, such details may be determined to be missing in response to mapping data indicating the presence of a features which is not observed in the sensor data.

In response to the determination of operation 104 being negative, control returns to block 102. The ADS 24 thereby continues to control the vehicle according to the primary mode unless and until missing road details are detected.

In response to the determination of operation 104 being, positive, control proceeds to operation 106. A determination is made of whether a reflection is found on the driving surface, as illustrated at operation 106. A reflection may indicate the presence of a liquid, e.g. water, on the driving surface. In a preferred embodiment, the determination comprises the identification of a color reflection, to thereby reduce false-positive identifications based on shadows. Examples of how this determination may be performed are described in U.S. Pat. No. 9,090,264 and in U.S. Patent Publication 2015/0363654, the disclosures of which are hereby incorporated in their entireties. However, in other embodiments, this determination may be performed using other methods.

In response to the determination of operation 106 being negative, control returns to block 102. The ADS thereby continues to control the vehicle according to the primary mode unless and until a reflection is found.

Figure 4A:
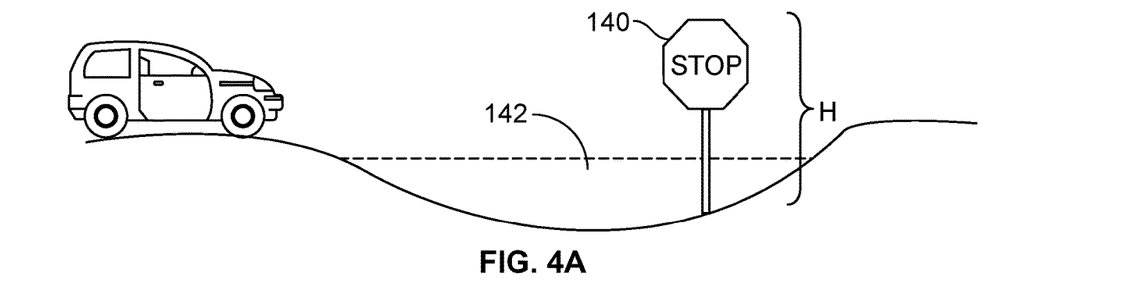
FIGS. 4A, 4B, and 4C are illustrations of a vehicle proximate a liquid-covered driving surface according to embodiments of the present disclosure.

In response to the determination of operation 106 being positive, the presence of liquid on the driving surface may be inferred. Control proceeds to operation 108. A determination is made of whether depth of the liquid may be estimated. In an exemplary embodiment, this determination is made by the controller 22 based on signals from the sensors 26. Various subroutines for determining the depth of liquid will be discussed below in conjunction with FIG. 4. The determination may be positive in response to any of the subroutines returning a valid response for the depth estimation.

In response to the determination of operation 108 being positive, control proceeds to operation 110. A determination is made of whether the depth exceeds a predefined threshold, as illustrated at operation 110. The predefined threshold corresponds to a depth of water through which vehicle travel is inadvisable. In an exemplary embodiment, the threshold is defined on the order of 6-12 inches; however, the threshold may be set for a given vehicle platform based on factors including ride height, driveline type (e.g. internal combustion, electric, fuel cell, etc.), or others.

In response to the determination of operation 110 being positive, control proceeds to block 112. The vehicle is controlled in a secondary operation mode, as illustrated at block 112. In embodiments where the ADS 24 comprises a Level Four or Level Five ADS, the secondary operation mode may comprise deviating around the liquid on the driving surface or decelerating prior to driving through the liquid. In such embodiments, the ADS 24 may perform an object segmentation step to determine the area of the driving surface covered in liquid and subsequently plan a new path around the liquid and/or decelerate. In embodiments where the ADS comprises a lower level of autonomy, e.g. Level Three, the secondary operation mode may comprise discontinuing autonomous control of the actuators 30 and returning control to the human operator. Other secondary modes of operation may also be implemented in addition to or in place of those described above.

Returning to operation 110, in response to the determination being negative, a determination is made of whether a pedestrian is proximate the water, as illustrated at operation 114. Likewise, returning to operation 108, in response to the determination being negative, control proceeds to operation 114. In an exemplary embodiment, this determination is made by the controller 22 based on signals from the sensors 26.

In response to the determination of operation 114 being positive, control proceeds to block 112 and the vehicle is controlled in the secondary mode, generally as discussed above. The vehicle may thereby avoid splashing the pedestrian with water while passing through the water.

In response to the determination of operation 114 being negative, control returns to block 102. The vehicle is thereby controlled according to the primary mode when the water is below the predefined depth and no pedestrians are detected.

Figure 3B:
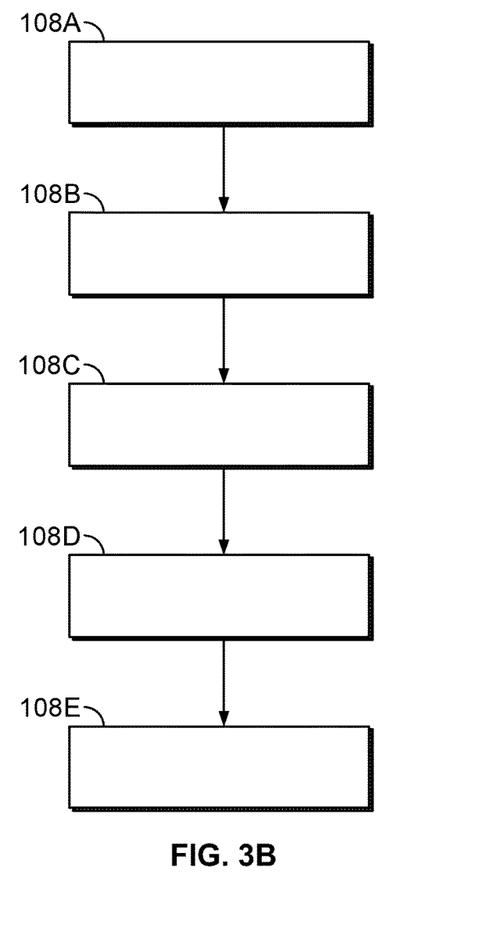

Referring now to FIG. 3B, methods of estimating depth of water on the driving surface are discussed in further detail. In an exemplary embodiment, these methods are performed by the controller 22 based on signals from the sensors 26. These methods may define subroutines of the operation 108, illustrated in FIG. 3.

In a first estimation step, the water depth may be estimated based on weather data, as illustrated at block 116. The weather data may comprise recent weather alerts in the vicinity of the vehicle 12, historical weather data such as flooding patterns, or any other pertinent weather information. The weather data may be stored on-board the vehicle 12 or received from a remote server. The controller 22 may process the weather data to define a probable depth for the water.

In a second estimation step, the water depth may be estimated based on geolocation and topographical data, as illustrated at block 118. In this step, a geolocation for the detected water may be determined using one or more of the sensors 26, e.g. a GPS sensor. In addition, topographic data for that geolocation is accessed, e.g. via on-board or remote storage. The controller 22 may process the topographic data to determine a relative height between the topographic data and the surface detected by the sensors 26. A water depth may thereby be inferred based on the difference.

Figure 4B:
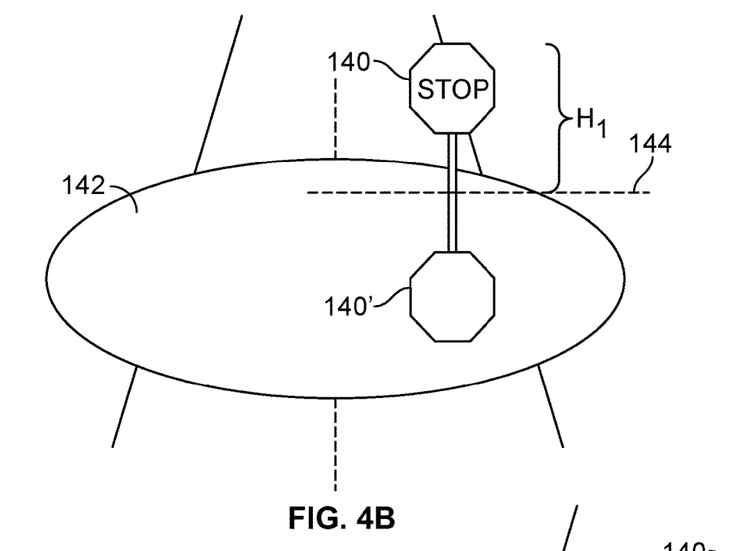

In a third estimation step, the water depth may be estimated based on object recognition and feature symmetry, as illustrated at block 122. As illustrated in FIGS. 4A and 4B, an object 140 may be partially submerged in liquid 142. While depicted as a stop sign for exemplary purposes, the object 140 may be any arbitrary object. In the illustrated embodiment of FIG. 4B, the liquid 142 is relatively calm, resulting in a clear reflection 140' of the object 140. The controller 22 performs object recognition based on signals from the sensors 26, e.g. via the classification and segmentation module 36. The object 140 is recognized, and a height H for the recognized object is obtained from an object height database. In an exemplary embodiment, the object height database comprises a plurality of road furniture and other common roadside objects and typical heights for such objects. A line of symmetry 144 is then identified between the observed object 140 and the reflection 140'. A height $H_1$ is then measured between the line of symmetry 144 and the top of the object 140. The depth of the liquid 142 may thereby be obtained as the difference between H and $H_1$.

Figure 4C:
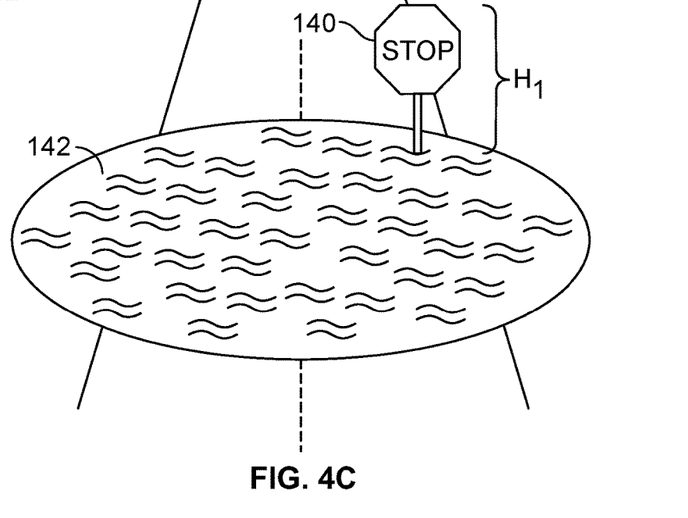

In a fourth estimation step, the water depth may be estimated based on detected object occlusion, as illustrated at block 124. As illustrated in FIGS. 4A and 4C, the object 140 is partially submerged in liquid 142. In the illustrated embodiment of FIG. 4C, the liquid 142 does not provide a clear reflection, e.g. due to waves or debris in the liquid 142. The controller 22 performs object recognition, identifies the object 140, and obtains the height H, generally as discussed above with respect to the third estimation step. A height $H_1$ of the visible portion of the object 140 is measured between the top of the object 140 and the liquid 142. The depth of the liquid 142 may thereby be obtained as the difference between H and $H_1$, i.e. the portion of the object 140 which is occluded by the liquid 142.

In a fifth estimation step, on-vehicle illumination may be controlled to facilitate estimation, as illustrated at block 126. In this estimation step, on-vehicle illumination sources, e.g. headlights, are automatically turned on by the controller 22. The resulting reflection may then be analyzed to obtain a reflection surface level, indicating a depth of the liquid.

The above are exemplary methods of estimating depth and are not intended to be an exhaustive list. In other embodiments, other methods may be used in place of or in conjunction with those discussed above.

As may be seen the present disclosure provides a system and method for automatically detecting when a driving surface is impassable or otherwise inadvisable for driving upon due to liquid, and to automatically control the vehicle appropriately.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
an actuator configured to control vehicle steering, acceleration, speed, or shifting;
a sensor configured to capture images of a region exterior to the vehicle; and
a controller in communication with the actuator and the sensor, the controller being configured to selectively control the actuator according to a primary mode and a secondary mode, to detect liquid on a driving surface proximate the vehicle, to estimate a depth of the liquid based on images captured by the sensor, and to control the actuator in the secondary mode in response to the depth exceeding a predefined threshold, wherein the controller is configured to estimate the depth of the liquid based on a position of a line of symmetry associated with the liquid, wherein the controller is configured to identify an object external to the vehicle based on signals from the sensor, the object having at least one known dimension, and to estimate the depth of the liquid based on the position of the line of symmetry relative to the object external to the vehicle.

2. The vehicle of claim 1, wherein the controller is configured to estimate the depth of the liquid based on a geolocation of the liquid on the driving surface and on topographical data for the geolocation.

3. The vehicle of claim 1, wherein the controller is configured to detect liquid based, in part, by detecting a color reflection in images captured by the sensor.

4. The vehicle of claim 1, wherein the controller is further configured to estimate an area of the liquid based on the images captured by the sensor, and to control the actuator in the secondary mode in further response to the area of the liquid.

5. The vehicle of claim 1, wherein the controller is configured to identify an object external to the vehicle based on signals from the sensor, the object having at least one known dimension, and to estimate the depth of the liquid based on an occluded region of the object.

6. The vehicle of claim 1, further comprising an exterior illumination source, wherein the controller is configured to selectively activate the exterior illumination source and estimate the depth of the liquid based on a reflection characteristic of the liquid caused by the exterior illumination source.

7. The vehicle of claim 1, wherein the primary mode comprises autonomous control of the actuator, and wherein the secondary mode comprises discontinuing autonomous control of the actuator.

8. The vehicle of claim 1, wherein the primary mode comprises autonomous control of the actuator according to a default path at a default speed, and wherein the secondary mode comprises autonomous control of the actuator to deviate from the default path or the default speed.

9. The vehicle of claim 6, wherein the controller is configured to control the actuator in the secondary mode in further response to a detected pedestrian proximate the liquid.

10. A method of controlling a vehicle comprising:
providing the vehicle with an actuator configured to control vehicle steering, acceleration, speed, or shifting, a sensor configured to capture images of a region exterior to the vehicle, and a controller in communication with the actuator and the sensor;
automatically controlling the actuator, via the controller, in a primary mode of operation;
automatically detecting liquid, via the controller, on a driving surface proximate the vehicle;
automatically identifying, via the controller, an object external to the vehicle based on signals from the sensor, the object having at least one known dimension;
automatically estimating, via the controller, a depth of the liquid based on images captured by the sensor based on a position of a line of symmetry associated with the liquid, wherein the automatically estimating the depth of the liquid is based on the position of the line of symmetry relative to the object external to the vehicle; and
in response to the depth exceeding a predefined threshold, automatically controlling the actuator, via the controller, in a secondary mode of operation.

11. The method of claim 10, wherein the automatically estimating the depth of the liquid is further based on a geolocation of the liquid and on topographical data for the geolocation.

12. The method of claim 10, further comprising automatically identifying, via the controller, an object external to the vehicle based on signals from the sensor, the object having at least one known dimension, wherein the automatically estimating the depth of the liquid is based on an occluded region of the object.

13. The method of claim 10, further comprising providing the vehicle with an exterior illumination source, and automatically activating the exterior illumination source via the controller in response to automatically detecting the liquid, wherein the automatically estimating the depth of the liquid based on images captured by the sensor is based on a reflection characteristic of the liquid caused by the exterior illumination source.

14. The method of claim 10, wherein automatically controlling the actuator in the primary mode of operation comprises autonomous control of the actuator, and wherein automatically controlling the actuator in the secondary mode of operation comprises discontinuing autonomous control of the actuator.

15. The method of claim 10, wherein automatically controlling the actuator in the primary mode of operation comprises autonomous control of the actuator according to a default path at a default speed, and wherein automatically controlling the actuator in the secondary mode of operation comprises autonomous control of the actuator to deviate from the default path or the default speed.

16. The method of claim 15, wherein the automatically controlling the actuator in the secondary mode of operation is in further response to a detected pedestrian proximate the liquid.

* * * * *